UNITED STATES PATENT OFFICE.

MARGUERITE F. PORTER, OF NEW YORK, N. Y.

INSECTICIDE.

1,010,797.     Specification of Letters Patent.     Patented Dec. 5, 1911.

No Drawing.     Application filed July 21, 1911. Serial No. 639,723.

*To all whom it may concern:*

Be it known that I, MARGUERITE F. PORTER, a citizen of the United States, and a resident of the borough of Manhattan, city, county, and State of New York, have invented a new and useful Composition of Matter for Use as an Insecticide and Like Purposes; and in order that those skilled in the art may compound and use the same I give the following specification thereof.

My invention has for its object the production of an effective composition of matter for the destruction of insects of all kinds, including cockroaches, bedbugs and other insect pests which will not only be certain and reliable in its action, but which will be non-inflammable and free from objectionable odor and injurious action upon articles of furniture and parts of buildings and the like to which it is applied.

In carrying out my invention I prepare a composition of the following ingredients, to wit: gasolene, carbon tetrachlorid, terpineol and oil of cedar. The oil of cedar specified is preferably the oil of cedar leaf. These ingredients are mixed together in suitable proportions to form a uniform mixture. The terpineol employed has strong insecticidal properties of itself, and in addition counteracts the penetrating and objectionable odor of the oil of cedar.

I have found the following proportions to give satisfactory results:

*Proportions for one gallon.*

|  | Quarts. | Pints. | Gills. |
|---|---|---|---|
| Gasolene | | 2 | |
| Carbon tetrachlorid | 2 | 1 | 3¼ |
| Terpineol | | | ¼ |
| Oil of cedar | | | ¼ |

The different proportions of the several ingredients may be varied more or less as desired and are given by way of illustration and not as a limitation of the invention.

In preparing the composition I have found it preferable to first mix the gasolene with the oil of cedar, then to add the terpineol to this mixture and lastly to add the carbon tetrachlorid.

The composition is applied in the usual way to situations frequented by insects and is an effective agent for their destruction. Its insecticidal properties are lasting and it may be handled and stored with safety, by reason of its non-inflammable character and its use is not attended with danger of poisoning to human life or injurious effect on the parts of furniture or buildings where it is applied.

Having described my invention, what I claim is:

1. An insecticide, comprising gasolene, carbon tetrachlorid, terpineol and oil of cedar.

2. An insecticide, comprising the following ingredients in substantially the proportions stated, to-wit: gasolene 2 pints, carbon tetrachlorid 2 quarts, 1 pint, 3¼ gills, terpineol ¼ gill and oil of cedar ¼ gill.

MARGUERITE F. PORTER.

Witnesses:
   HENRY C. WORKMAN,
   ELISE S. BLACK.